United States Patent [19]

Jensen et al.

[11] 3,758,754

[45] Sept. 11, 1973

[54] READING OF MANUALLY MANIPULATED ENCODED DEVICES

[75] Inventors: Billy M. Jensen, Sandy; Clifton McDermott, Salt Lake City, both of Utah

[73] Assignee: Bio-Logics Products, Inc., Salt Lake City, Utah

[22] Filed: Jan. 31, 1972

[21] Appl. No.: 222,422

[52] U.S. Cl. .......................... 235/61.11 E, 250/219 D

[51] Int. Cl. .......................... G06r 7/10

[58] Field of Search .............. 235/61.11 R, 61.11 B, 235/61.11 C, 61.11 D, 61.11 E, 61.11 A, 61.7 R, 61.12 R

[56] References Cited

UNITED STATES PATENTS

| | | | |
|---|---|---|---|
| 3,665,164 | 5/1972 | Beveridge et al. | 235/61.11 E |
| 3,358,824 | 12/1967 | Stagnitto | 235/61.12 R |
| 3,680,967 | 8/1972 | Engelhardt | 235/61.11 E |
| 3,538,311 | 11/1970 | Weidmann | 235/61.11 D |

OTHER PUBLICATIONS

IBM Tech. Discl. Bull'n. entitled "Credit Card Reader," by Bowers and Laenen, Vol. 9, No. 12, May 1967, pp. 1760–1761.

*Primary Examiner*—Thomas A. Robinson
*Attorney*—B. Dean Criddle

[57] ABSTRACT

Apparatus for reading manually manipulated encoding identification tags and the like, said apparatus comprising a housing mountable on or adjacent a computer or piece of automatic equipment and having a slot extending along at least one side for slidably receiving an opaque identification device having a plurality of holes extending through said device arranged in a predetermined code, a plurality of light-emitting diodes disposed transversely of said slot along one side thereof, a plurality of photodiodes correspondingly disposed along the opposite side of said slot, means connecting said light-emitting diodes for actuation from a source external to said apparatus, and a pair of limit switches disposed adjacent opposite ends of said slot and operable by engagement with said identification device upon manual movement of said device along said slot to provide signals to said external source to control actuation of said light-emitting diodes.

7 Claims, 5 Drawing Figures

READING OF MANUALLY MANIPULATED ENCODED DEVICES

BACKGROUND

1. Field of Invention

This invention relates to identification systems and is particularly directed to an improved reading device for machine reading manually manipulated identification tags and the like.

As is well known, the use of automatic equipment has become common in numerous fields of technology and computers are often employed to actuate or control the operation of such equipment and to relate data resulting from such operation with additional data obtained from other sources. When this is done, it is frequently necessary to provide some means, such as a tag, for identifying a particular object during one or more such operations and for relating the particular object with other objects or data. It is generally preferable that the identification means be machine-readable to facilitate such relation by the computer or automatic device.

One field in which such automation, identification and relation are becoming increasingly important is the field of medicine. Thus, in hospitals and the like, it is becoming standard practice to provide a patient with an identification bracelet, or the like, which is permanently attached to the patient and bears an identification device comprising machine-readable indicia which indicia can be reproduced, in one manner or another, to identify specimens, samples, reports, and the like relating to the particular patient.

2. Prior Art

Numerous systems and devices have been proposed heretofore for accomplishing this. Unfortunately, however, there are almost as many tyoes of identification devices as there are manufacturers of automated equipment and each manufacturer, where encoded identification devices are used, has tended to design his automatic equipment with an integral reading device which is compatible only with the indentification devices produced by him. This has tended either to force the hospital or laboratory to purchase all of its equipment from a single source or to require that the identification indicia be personally copied from one identification system to another, which defeats the whole purpose of the machine-readable systems. Some identification reading devices have been proposed which were not integral with a particular piece of automatic equipment. However, these devices have often been bulky, complex and expensive, have been difficult to mount or lcoate adjacent a desired automatic device, have provided outputs which were not compatible with computers or other equipment, or have not been capable of reading identification devices while the identification devices were attached to an object, such as a test tube.

BRIEF SUMMARY AND OBJECTS OF INVENTION

These disadvantages of the prior art are overcome with the present invention and a reading device for manually manipulated encoded identification devices is proposed which is simple, essentially physically independent, compact and inexpensive, can easily be mounted on or adjacent a desired piece of equipment, can accommodate identification devices which are independent of or attached to an object, and provides an output which is compatible with substantially any computer or automatic device, such as automatic chemistry analyzers found in hospital laboratories.

The advantages of the present invention are preferably attained by providing an identification reading device comprising a relatively flat, generally rectangular housing having a slot extending a considerable distance along one side thereof and communicating with one end thereof; a plurality of light-emitting diodes disposed transversely of said slot along one side thereof, a plurality of photodiodes disposed along the other side of said slot in a manner corresponding with said light-emitting diodes, guide means operable to engage and guide an identification device during movement of said identification device along said slot, a first limit switch located adjacent one end of said slot and engagable by said identification device to actuate said light-emitting diodes, and a second limit switch located adjacent the opposite end of said slot and engagable by said identification device to deenergize said light-emitting diodes.

Accordingly, it is an important object of the present invention to provide an improved instrument for reading identification devices.

Another significant object of the present invention is to provide apparatus for machine-reading manually manipulated identification devices which apparatus is compact and relatively inexpensive.

A further paramount object of the present invention is to provide apparatus for machine-reading identification devices which apparatus can readily be mounted on or adjacent automatic equipment.

Another principal object of the present invention is to provide apparatus for machine-reading an identification device while the device remains attached to an object.

An additional primary object is the provision of method and apparatus for reading a manually manipulated encoded identification device while it remains attached to a test tube having a medical specimen therein and communicating the information read to the output portion of an automatic laboratory analyzer where the results of tests on the specimens are also communicated.

A specific object of the present invention is to provide apparatus for machine-reading identification devices, said apparatus comprising a housing having a slot extending along at least one side thereof, a plurality of light-emitting diodes disposed transversely of said slot along one side thereof, a plurality of photodiodes each disposed to receive light from a respective one of said light-emitting diodes, a first limit switch located adjacent one end of said slot and engagable by an identification device as said identification device is moved along said slot to energize said light-emitting diodes, and a second limit switch located adjacent the other end of said slot and engagable by said identification device to deenergize said light-emitting diodes.

These and other objects and features of the present invention will be apparent from the following detailed description taken with reference to the accompanying drawings.

DETAILED DESCRIPTION OF ILLUSTRATED EMBODIMENT

Figure 1:
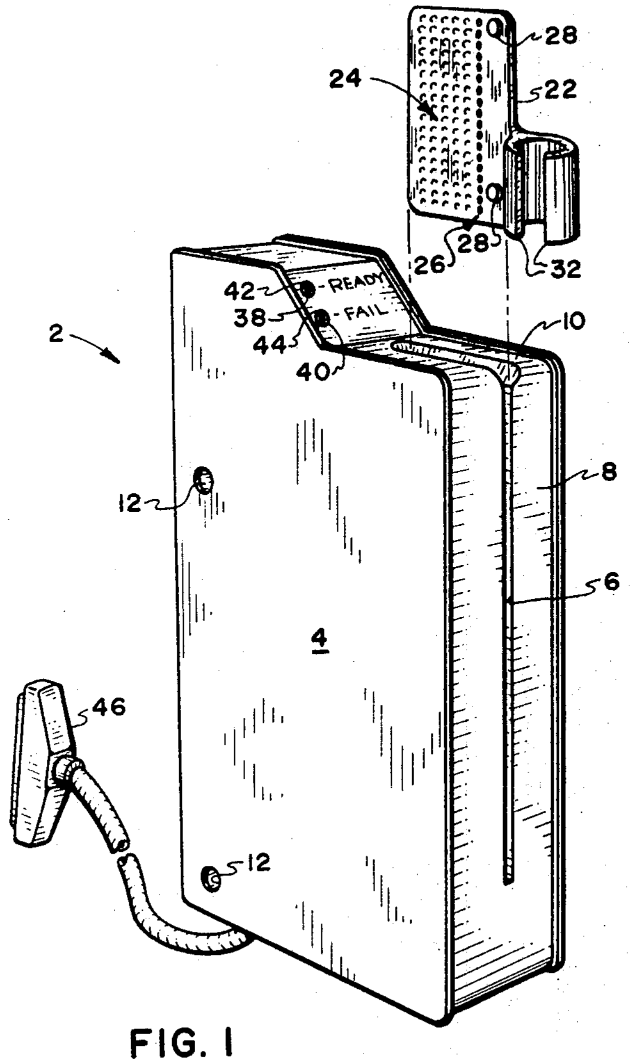
FIG. 1 is an isometric view of a reading device embodying the present invention, together with an identification device for use therewith.

In that form of the present invention chosen for purposes of illustration, FIG. 1 shows an essentially physically independent reading device, indicated generally at 2, comprising a relatively flat, generally rectangular housing 4 having an elongated slot 6 formed in one side 8 and communicating with one end 10 of the housing 4. Internally threaded recesses 12 are provided adjacent one edge of the housing 4 to facilitate mounting the reading device 2, by means of bolts and suitable brackets, not shown, in a desired location, such as on or adjacent a piece of automatic equipment. If desired, the physically independent reader 2 may remain separate from other equipment. Obviously, the reading device 2 may be mounted with the slot 6 extending vertically, as shown, horizontally, or in any other orientation, as desired.

Figure 3:
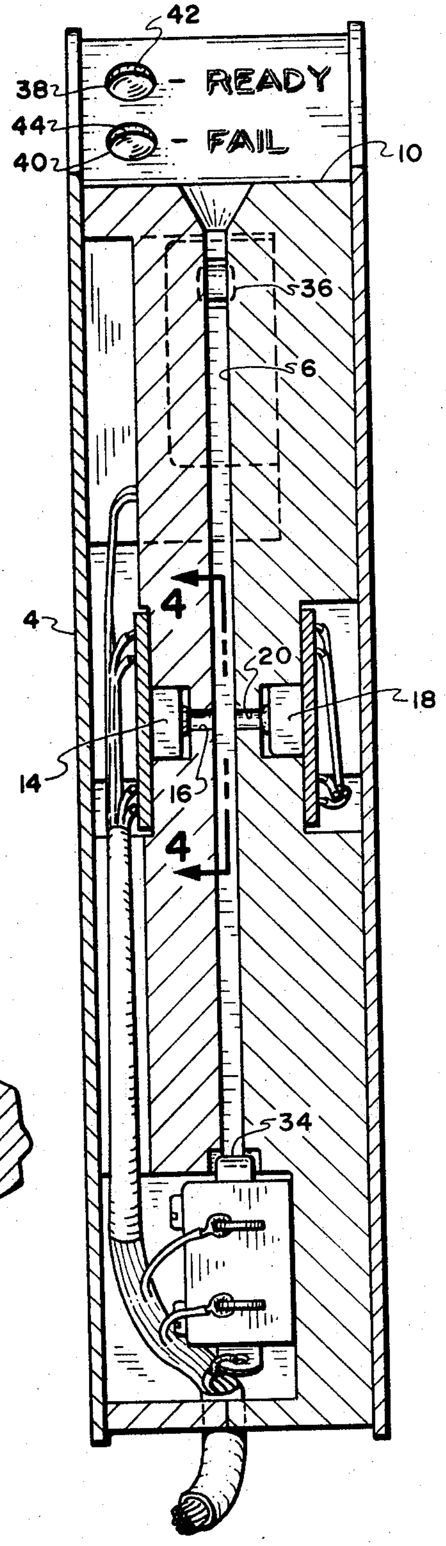
FIG. 3 is a transverse section through the reading device of FIG. 1, taken on line 3—3 of FIG. 2.
Figures 2, 4:
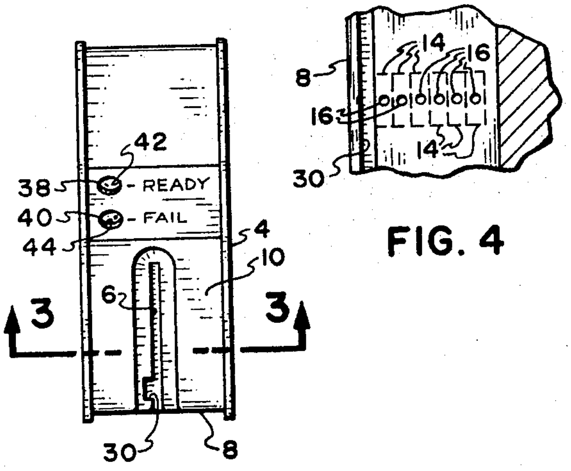
FIG. 2 is a plan view of the reading device of FIG. 1.
FIG. 4 is a detailed view, taken on the line 4—4 of FIG. 3.
Figure 5:
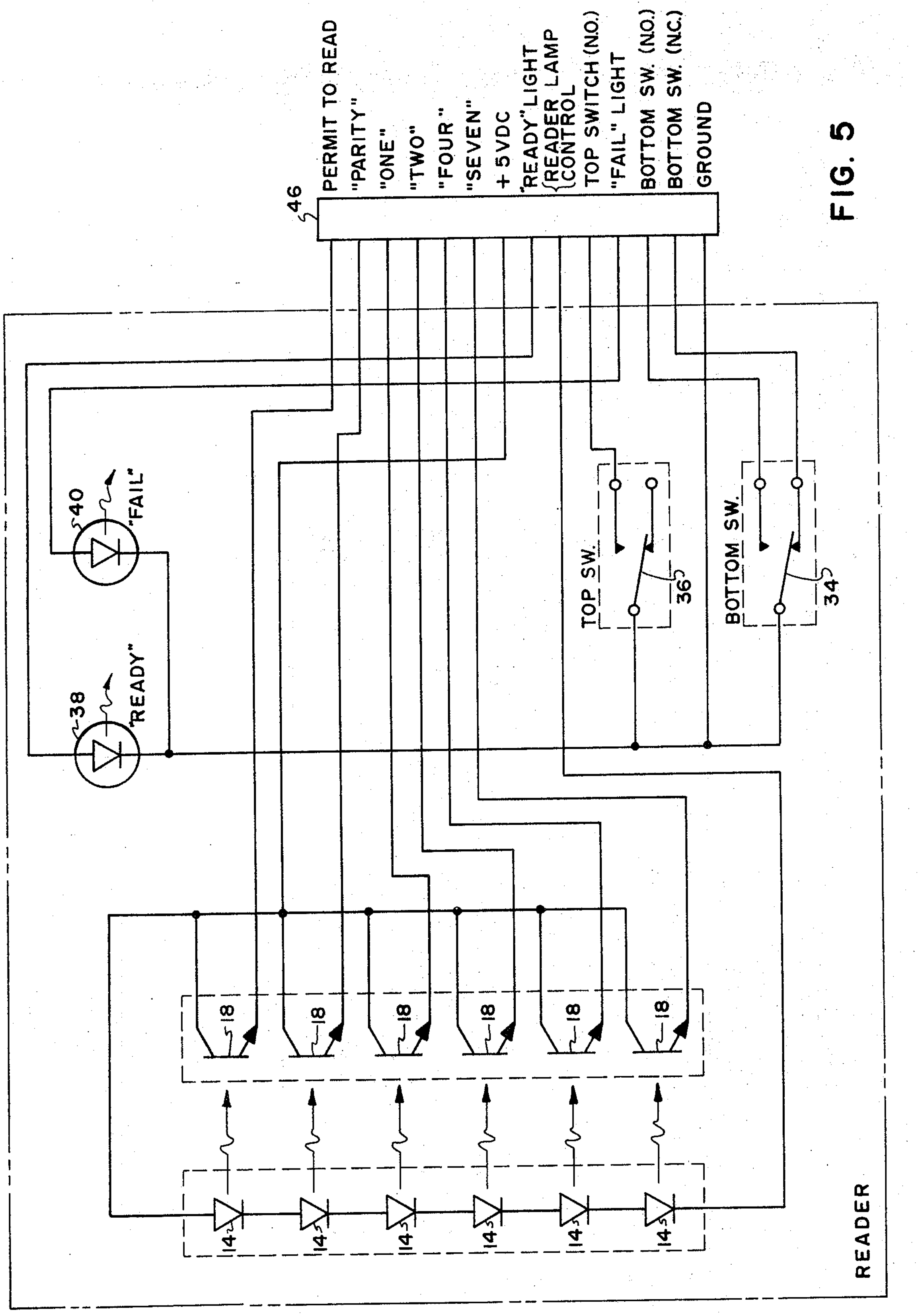
FIG. 5 is a diagrammatic representation showing the electrical circuit of the device of FIG. 1.

As best seen in FIGS. 3 and 4, within the housing 4, a plurality of light-emitting diodes 14 are disposed in a row extending transversely across one side of the slot 6 and are in optical communication with slot 6 by means of an equal plurality of windows in the form of transverse slots or apertures 16. In addition, a plurality of photodiodes 18 are disposed in a row extending transversely across the opposite side of the slot 6 and are in optical communication with slot 6 and the light-emitting diodes 14 by means of a plurality of transverse slots or holes 20 which are aligned with the transverse slots or holes 16. The number of photodiodes 18 is equal to the number of the light-emitting diodes 14 and this number may, obviously, be as desired.

In the illustrated embodiment, six of the light-emitting diodes 14 and six photodiodes 18 are provided. This permits the reading device 2 to accommodate and read a manually manipulated, optical readable identification device, indicated at 22 in FIG. 1, illustrated as being formed of opaque, frangible material and having six columns of encodable positions arranged in rows, as indicated generally at 24. Holes have been punched through all of the encodable positions or sites in one column 26, to create a "permit to read" function, while the encodable positions of the remaining five columns are selectively punched with two holes in each row in accordance with a two-of-five code, for identification purposes. The identification device 22 is generally planar, but is provided with a pair of linearly spaced studs 28 which fit within and are slidable along a recess 30 extending along one side of the slot 6 of the reading device 2 to assure proper positioning and correct reading of the identification device 22 in the reading device 2 during the reading operation. In addition, the identification device is provided with suitable structure, such as resilient clamping jaws 32, for attaching the identification device 22 to an object, such as a sample tube, not shown. In one preferred form, the identification device with a capped test tube press-fit within jaws 32 and containing a specimen, such as blood from a patient, is manually reciprocated within the slot 6, studs 28 disposed within guide track 30 defining the path. The code of the device identifies the patient and output signals from reader 2 are communicated to the output mechanism of a laboratory chemical analyzer where signals representing the test results performed on the same specimens are also communicated. Thus, the identification of the patient is available in conjunction with the test results pertaining to the same patient.

A first limit switch 34 is located within the housing 4 adjacent one end of the slot 6 and is positioned to be actuated by the identification device 22 as the identification device 22 is moved along the slot 6. In addition, a second limit switch 36 is located within the housing 4 adjacent the other end of the slot 6 and is also positioned to be actuated by the identification device 22 as the identification device 22 is moved along the slot 6. A pair of indicator lamps 38 and 40 are mounted in suitable apertures 42 and 44 in the housing 4 and the electrical connections for the light-emitting diodes 14, photodiodes 18, limit switches 34 and 36, and indicator lamps 38 and 40 are made through connector 46 to appropriate external circuitry, which may be part of a computer or a piece of automatic equipment.

In use, the reading device 2 is mounted, in a desired orientation, on or adjacent a computer or piece of automatic equipment and connector 46 is attached. Each of the objects to be identified has an identification device, similar to that shown at 22 in FIG. 1, attached thereto. Subsequently, when it is desired to read the identification device 22, the identification device 22 is inserted into slot 6 of the reading device 2 in a manner such that the guide studs 28 of the identification device 22 are received within the recess 30 of the reading device 2. When the identification device is properly positioned within slot 6, it actuates limit switch 36 and, upon movement to the opposite end of slot 6, actuates limit switch 34. This signals the external circuitry to energize the light-emitting diodes 14, photodiodes 18 and the "Ready" lamp 38. Thus, the reader reads the code of the identification device during displacement in one direction only. Thereafter, the identification device 22 is withdrawn from the slot 6 and, as this is done, the encodable positions 24 are caused to move between the light-emitting diodes 14 and the photodiodes 18. Since, as noted above, the identification device 22 is opaque, light from the light-emitting diodes 14 will, normally, be prevented from reaching the photodiodes 18. However, where holes have been punched through any of the encodable positions 24 of the identification device 22, light from the appropriate one of the light-emitting diodes 14 will be passed to the corresponding one of the photodiodes 18, causing the particular one of the photodiodes 18 to pass a signal via connector 46 to the external device associated with the reading device 2.

Obviously, numerous variations and modifications may be made without departing from the present invention, Accordingly, it should be clearly understood that the form of the present invention described above and shown in the accompanying drawings is illustrative only and is not intended to limit the scope of the invention.

What is claimed is:

1. Reader apparatus for reading opaque identification devices having aligned frangible encodable positions, said apparatus comprising a housing having spaced apart faces, spaced apart ends interconnecting the faces, spaced apart sides interconnecting the faces and the ends,
a slot extending into one of said ends and one of said sides,
a recess opening into said slot and extending parallel to the said one side and away from said one end,
at least one light-emitting means disposed transversely of said slot along one side thereof;
a photodiode spaced from each light-emitting means and disposed along the opposite side of the slot, each
said photodiode being positioned to receive light from one of said light-emitting means,
switch means disposed adjacent to said slot and engageable by an identification device upon full insertion of said identification device into the slot and the recess to control energization of each of said light-emitting means and to hold said light-emitting means energized until the aligned encodable positions on the identification device have each moved between a light-emitting means and a photodiode as the identification device is moved out of the slot and recess.

2. Reader apparatus as in claim 1, wherein
the switch means, the light-emitting means, and the photodiodes are adapted to be connected into a circuit including means external to the housing for energizing and deenergizing the light-emitting means.

3. Reader apparatus as in claim 2, further including
ready and fail indicator means on the housing and connected into the circuit whereby the ready indicator means indicates when the reader apparatus is ready to read an identification device and the fail indicator means indicates when the data arrangement is improperly presented to be read.

4. The combination of an identification device and reader apparatus wherein
said identification device comprises
a planar tab formed of opaque, frangible material and having a plurality of aligned encodable positions thereon whereby a hole is adapted to be punched through said tab at each of said positions, and stud means projecting from at least one face of the tab at a marginal edge of said encodable positions; and wherein
said reader apparatus includes
a housing having
spaced apart faces,
spaced apart ends interconnecting the faces,
spaced apart sides interconnecting the faces and the ends,
a slot extending into one of said ends and one of said sides, said slot receiving the planar tab therein,
a recess opening into said slot and extending parallel to the said one side and away from said one end said recess receiving said stud means when said tab is inserted into the slot through the said one end,
at least one light-emitting means disposed transversely of said slot along one side thereof,
a photodiode spaced from each light-emitting means and disposed along the opposite side of the slot, each said photodiode being positioned to receive light from one of said light-emitting means through holes in the tab at encodable positions, and
switch means disposed adjacent to said slot and engageable by the tab when said tab is inserted fully into the slot to control energization of each of said light-emitting means and to hold said light-emitting means energized until the aligned encodable positions on the tab have each moved between a light-emitting source and a photodiode as the tab is moved out of the slot.

5. The combination of claim 4, wherein
the switch means, the light-emitting means, and the photodiodes are adapted to be connected into a circuit including means external to the housing for energizing and deenergizing the light-emitting means.

6. The combination of claim 5, further including
ready and fail indicator means on the housing and connected into the circuit whereby the ready indicator means indicates when the reader apparatus is ready to read an indentification device and fail indicator means indicates when the data arrangement is improperly presented to be read.

7. The combination of claim 6, wherein the stud means comprises a pair of spaced apart studs.

* * * * *